FIG-1

VICTOR T. FAHRINGER, INVENTOR

BY Paul S Eaton
ATTORNEY

April 28, 1953

V. T. FAHRINGER 2,636,951

APPARATUS FOR DETECTING IRREGULARITIES
IN WEB AND STRAND MATERIAL

Filed Dec. 2, 1949

Victor T. Fahringer,
INVENTOR.

BY
ATTORNEY

Patented Apr. 28, 1953

2,636,951

UNITED STATES PATENT OFFICE 2,636,951

APPARATUS FOR DETECTING IRREGULARITIES IN WEB AND STRAND MATERIAL

Victor T. Fahringer, Clarksville, Va., assignor to Robbins Mills, Inc., New York, N. Y., a corporation of New York Application December 2, 1949, Serial No. 130,812

16 Claims. (Cl. 200—52)

This invention relates to web and strand inspection apparatus and more especially to a device for detecting irregularities appearing on the surfaces of cloth, paper, or any other material which is processed in web form as well as individual strands such as yarn and the like.

It is an object of this invention to provide apparatus through which a sheet material or a strand or a plurality of strands may be passed and comprising one or more rings which are supported on a shaft extending therethrough, the shaft being substantially smaller than the internal diameter of the ring or rings so the rings may swing on the shaft. The sheet material, strands or the like are adapted to pass immediately beneath and in close proximity to the lower surfaces of the ring depending from said shaft and means are provided whereby upon a projection appearing on the surface of the cloth or strand, the ring disposed in its path will be elevated slightly, as it is swung in the direction of movement of the cloth or strand, by the said projection and this will complete a circuit to other parts of the machine for the purpose of stopping the machine or to actuate indicating means as a warning to the operator.

It is another object of this invention to provide a device adapted to be mounted on textile machines and comprising a block on which a lower and an upper shaft are fixedly mounted in spaced relation to each other, a metallic ring loosely mounted on the upper shaft and the inside diameter thereof being substantially greater than the outside diameter of the upper shaft, the lower surface of the metallic ring being disposed closely adjacent the upper surface of the lower shaft and whereupon a strand of yarn may pass between the lower surface of the metallic ring and the upper surface of the shaft and upon a thickened place in the yarn passing over said lower shaft, the ring on the upper shaft will be elevated slightly. Suitable contact means are provided which will be engaged by the ring upon the ring being projected upwardly in the manner described to thus complete a circuit to other parts of the machine for stopping the machine or actuating other types of warning signals or stop motions as desired.

It is still another object of this invention to provide an apparatus of the type described wherein the upper shaft is disposed slightly off center relative to a vertical plane above the axis of the lower shaft and whereby the yarn passing over the lower shaft will then pass beneath a ring on the upper shaft and will hold the ring in an elevated position and upon breakage of the yarn, the ring will fall, by gravity, causing the same to engage a contact member to thus complete a circuit to a suitable electrical apparatus such as a warning signal or a warning lamp or an electrical stop motion on a particular machine on which the yarn detecting apparatus may be installed.

One of the most important features of the present invention is the mechanical advantage obtained by use of rings as levers. For example, upon a thick place or projection on the web material engaging a ring, the point of tangency between the ring and the ring support changes as the ring is swung in the direction of movement of the web material. The normal point of tangency, which is present when a normal thickness of web material passes beneath the ring, acts as a fulcrum for the ring, which ring acts as a curved lever as it is swung forwardly by a projection on the web material. Thus, any point on the ring forwardly of its normal point of tangency, up to the foremost portion of the ring, will move relatively further than a point at, or immediately adjacent, the immediate point of tangency, and, consequently, a point diametrically opposite to the point of tangency will move less than any point forwardly of said normal point of tangency. Therefore, the slight displacement or movement of the ring caused by the projection on the web material will be multiplied at the point at which the ring engages the contact means. The mechanical advantage thus obtained eliminates the need of amplifiers or the like for registering such movement.

Some of the objects of the invention having been stated, other objects will appear as the description proceeds when taken in connection with the accompanying drawings in which—

Figure 1:
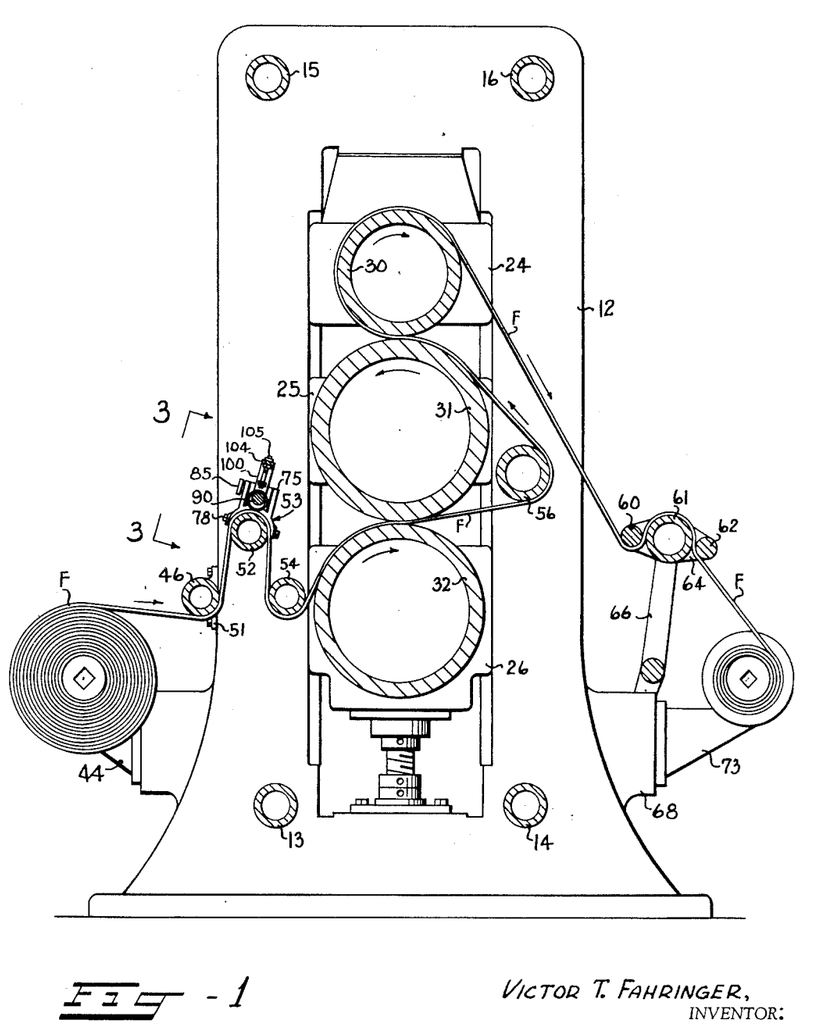
Figure 1 is a longitudinal vertical sectional view through a typical calender machine and showing one form of the invention applied thereto and showing a web material, such as fabric F passing through the machine, in elevation.
Figure 2:
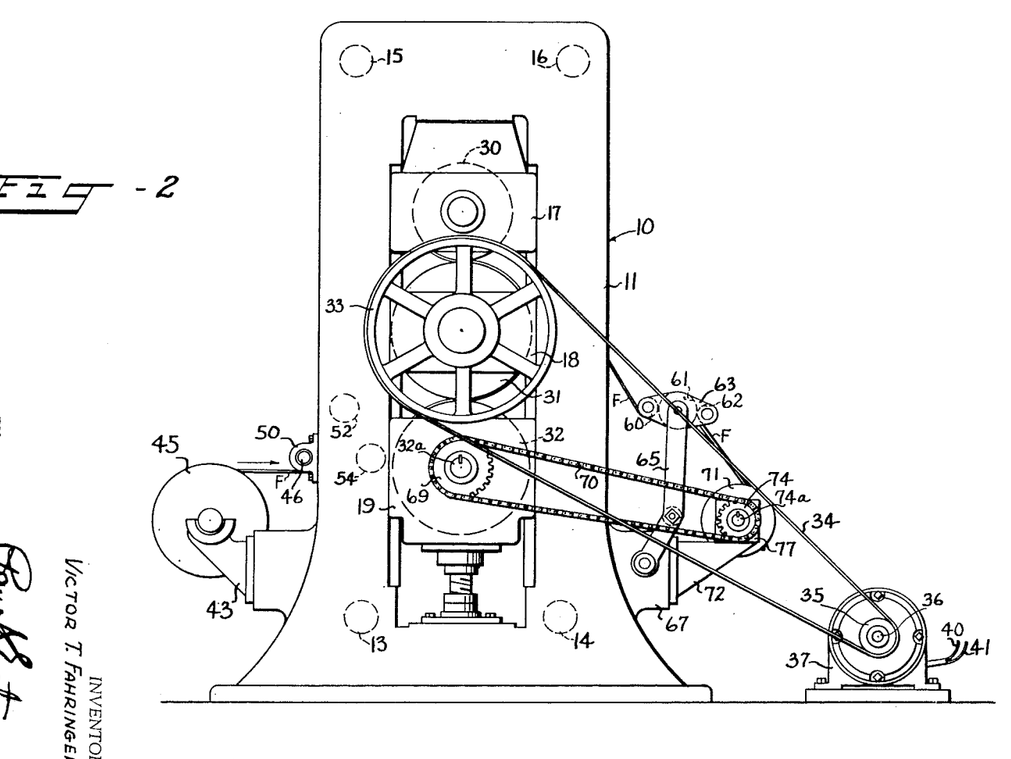
Figure 2 is an elevation of one side of the calender machine shown in Figure 1 and showing a typical driving means therefor.

Referring more specifically to the drawings of the first form of the invention shown in Figures 1 to 8, inclusive, a calender broadly designated at 10 is shown in Figures 1 and 2 and comprises side frame members 11 and 12 which are connected by horizontally disposed frame members 13, 14, 15 and 16. The present invention may be used with any type of calender, as well as many other machines wherein a web material or a plurality of parallel strands of material are processed, and the calender shown in Figures 1 and 2 is merely shown by way of illustration. The calender 10 has the usual bearing blocks 17, 18 and 19 mounted in the frame member 11 (Figure 2) and coinciding bearing blocks 24, 25 and 26 are mounted in the usual manner in the frame member 12 (Figure 1).

Conventional calender rolls 30, 31 and 32 are journaled at one end thereof in the respective bearing blocks 17, 18 and 19 and are journaled at the other ends thereof in the respective bearing blocks 24, 25 and 26, these bearing blocks are vertically adjustable in the side frame members 11 and 12 in the usual manner for determining the pressure between adjacent calender rolls. The calender roll 31 has a pulley 33 fixedly mounted on the journaled end thereof and on which a belt 34 is mounted. The belt 34 is also mounted on a pulley 35 fixed on a shaft 36 of an electric motor 37 having wires 40 and 41 extending therefrom which are part of an electrical circuit to be later described.

The left-hand or feed ends of the side frame members 11 and 12 in Figures 2 and 1, respectively, have conventional bearing members 43 and 44 thereon on which opposed ends of a cloth roll 45 are journaled. The cloth roll 45 pays out a fabric, paper, or other web material indicated at F and this web material F passes beneath a first tension roll 46 which is used in conjunction with the present invention and is not a usual part of a calender. This roll 46 may be rotatably mounted in bearing members 50 and 51 suitably secured to the feed ends of the side frame members 11 and 12, respectively, if so desired or this roll 46 may be stationary, the cloth passing thereby in sliding engagement therewith.

The web material F then extends upwardly from the roll 46 and passes over a material support member in the form of a shaft 52 fixedly mounted in and extending between the side frame members 11 and 12, this shaft 52 being a part of the improved web and strand inspecting apparatus broadly designated at 53. A further description of the web and strand inspecting apparatus will follow later in the specification.

The web material F then extends downwardly from the support 52 and passes beneath a second pressure roll 54 which may be either rotatably or fixedly mounted in the side frame members 11 and 12 and is also a part of the present invention. The rolls 46 and 54 are termed as tension rolls since they may be stationary or rotatable, as desired, and are instrumental in holding the web material against the upper surface of the web support 52 provided to insure that the web material F will be held taut as it passes over the upper surface of the roll 52 of the web and strand inspecting apparatus 53.

The web material F then passes over the lower calender roll 32 and between the lower and middle calender rolls 32 and 31 and then passes partially around a stationary roll 56 and then upwardly between the middle and upper calender rolls 31 and 30, respectively. The web material F then partially surrounds the upper calender roll 30 and extends downwardly therefrom at an angle and passes over and beneath and over conventional tension rolls 60, 61 and 62, successively. Opposed ends of these tension rolls 60, 61 and 62 are fixedly or rotatably mounted in bearing blocks 63 and 64 oscillatably mounted in the upper ends of swing arms 65 and 66 which are pivoted at the lower ends thereof on opposed sides of conventional projections 67 and 68 on the side frame members 11 and 12, respectively, of the calender 10.

The web material F then extends downwardly from beneath the roll 62 and is wound on a conventional take-up roll 71 journaled at opposed ends thereof in bearing members 72 and 73 extending from the projections 67 and 68 of the side frame members 11 and 12, respectively. Suitable take-up means, not shown, are provided for taking up on the take-up roll 71 as the cloth is taken from the cloth roll 45 at the other end of the machine. It will be observed in Figure 2 that the lower calender roll 32 has a shaft 32a projecting through the bearing member 19 and a sprocket wheel 69 is fixed on the shaft 32a. A sprocket chain 70 is mounted on the sprocket wheel 69 as well as a sprocket wheel 74 fixed on a shaft 74a projecting from a suitable take-up mechanism which may be disposed within a housing 77 for taking up on the material F as it is wound on the take-up roll 71. This completes the structure of one type of calender with which the present invention is adapted to be associated.

Figures 3, 4:
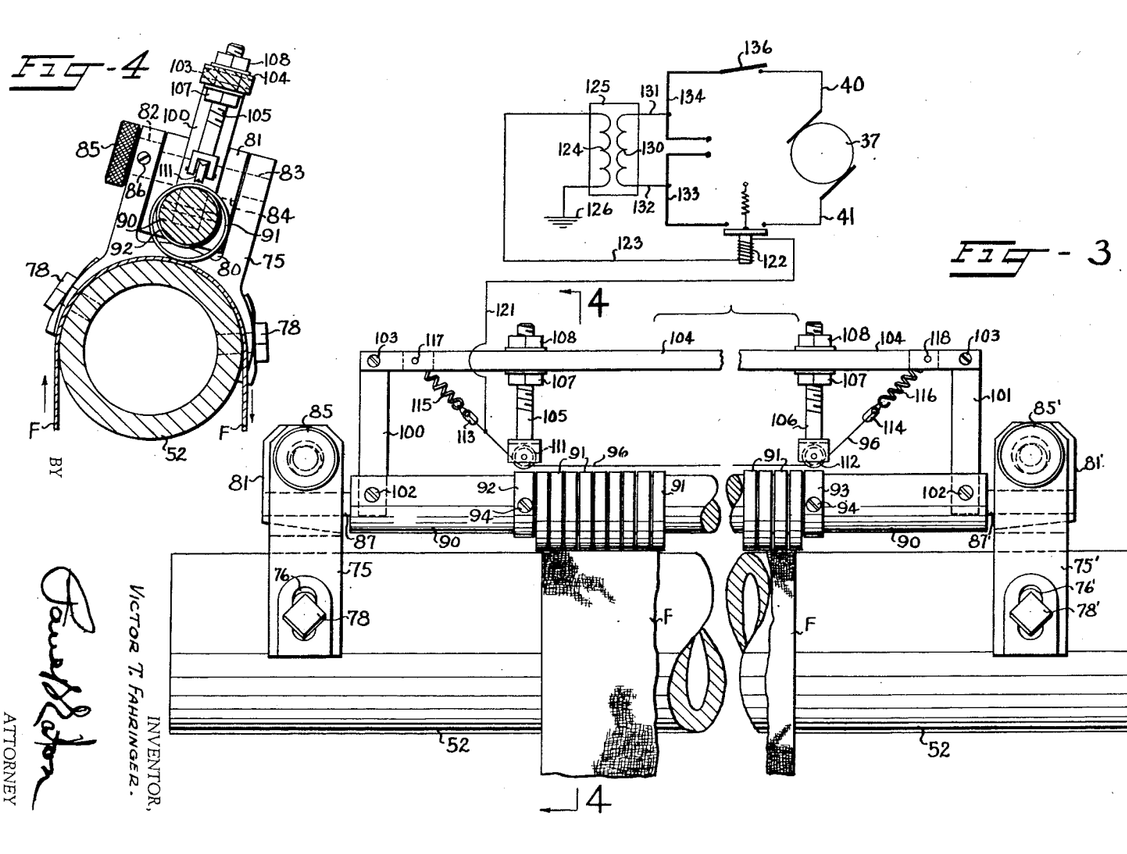
Figure 3 is an enlarged elevation of the web and strand inspecting apparatus removed from the calender machine and looking substantially along the line 3—3 in Figure 1 and also showing, schematically, a wiring diagram associated therewith for opening a circuit to the electric motor of the calender upon actuation of the cloth detecting apparatus.
Figure 4 is a vertical sectional view taken substantially along the line 4—4 in Figure 3 and showing the web and strand inspecting apparatus disposed at an angle corresponding to the angle at which it is disposed in Figure 1.

Now, referring to Figures 3 and 4, one form of the invention is shown in detail, Figure 4 being an enlarged view of the web inspecting apparatus 53 shown in the left-hand central portion of Figure 1. Mounted for adjustment about the support shaft 52 are spaced standards 75 and 75′ both of which are identical along with the parts associated therewith, except the parts being opposite hand, and only the standard 75 will be described with like parts associated with the standard 75' bearing the same reference characters with the prime notation added.

The standard 75 is curved at the lower end thereof to conform to the curvature of the shaft 52 and has adjustment slots 76 therein which are slidably penetrated by screws 78 for securing the standard 75 in adjusted position on the shaft 52. The standard 75 extends upwardly and has an opening 80 therein in which a bearing member 81 is mounted for vertical sliding movement so as to permit the bearing member 81 to be adjusted.

Now, any suitable means may be provided for adjusting the bearing member 81 relative to the vertical and, in the present instance, there is shown a shaft 82 having a restricted threaded end portion 83 which is rotatably mounted in one of the walls of the opening 80 and this shaft has an eccentric medial portion 84 integral therewith which slidably penetrates the bearing member 81. A suitable knurled knob 85 is provided for manipulation of the shaft 82, and, it is evident that partial rotation of the shaft 82 will cause the bearing member to move for adjustment purposes by virtue of the eccentric medial portion 84. A suitable set screw 86 is provided in the standard 75 for locking the shaft 85 in adjusted position.

Fixedly mounted in the bearing members 81 and 81' are the restricted opposed ends 87 and 87' of a ring support in the form of a shaft 90. The restricted ends 87 and 87' of the ring support 90 are, necessarily, fixed in the bearing members 81 and 81' to prevent rotation of the ring support shaft 90 in view of the structure mounted thereon to be presently described. Swingably mounted on the ring support shaft 90 is a plurality of metallic detecting rings 91 which are of a substantially larger inside diameter than the diameter of the ring support shaft 90, these rings all being of exactly the same exterior and interior diameter so as to provide a uniform wall thickness and when supported by the ring support shaft 90, the upper surfaces of these rings 91 present a uniform and substantially leveled surface from the outermost ring at one end of the group of rings 91 to the outermost ring at the other end of the group of rings 91. It is evident that the number of rings employed is determined by the width of the web material being processed. The metallic rings 91 are prevented from having excessive endwise movement on the ring support 90 by spaced collars 92 and 93 fixedly mounted, as by set screws 94, on the web support 90.

Now, in the event that any irregularities in the web or strand material, such as foreign objects, slubs or the like, which may increase the thickness of the web material F, pass over the inspection roll 52, any of the metallic rings 91 which happen to be disposed in the path of the thickened area in the web material F will be moved upwardly and swung slightly in the direction of movement of the web material F so as to engage a contact member in the form of a bare wire 96 extending in parallel relation to the axis of the web support 90 and normally spaced slightly above the rings 91 to thus complete a circuit in a manner to be later described. This contact wire 96 is mounted in a suitable frame comprising vertically disposed end members 100 and 101, the lower ends of which are fixedly mounted adjacent opposed ends of the web support 90 and are secured therein by any suitable means such as screws 102. The upper ends of the members 100 and 101 are secured, as by screws 103, to opposed ends of a horizontally disposed bar 104.

Suitable bearing members such as spaced bolts 105 and 106 slidably penetrate the horizontally disposed bar 104, each of the bolts 105 and 106 is held in adjusted position by lock nuts 107 and 108 bearing against opposed sides of the bar 104. The lower ends of the bolts 105 and 106 (Figure 3) are suitably slotted for reception of pulleys 111 and 112, respectively, which are made of an insulation material, and which are rotatably mounted in the lower ends of the bolts 105 and 106.

The bare contact wire 96 extends between and beneath the pulleys 111 and 112 and opposed ends of the wire 96 are connected to insulators 113 and 114 which are, in turn, connected to the proximate ends of tension springs 115 and 116 whose remote ends are connected, as at 117 and 118, respectively, to the bar 104. The bar 104 has suitable slots therein for reception of the upper ends of the springs 115 and 116.

There is shown, in the upper portion of Figure 3, a schematic wiring diagram illustrating one of the many types of circuits which may be connected to and actuated by the present apparatus. Connected to the contact wire 96 is one end of a wire 121 which is connected to one side of the coil of a relay switch 122. Extending from the other side of the coil of the relay switch 122 is a wire 123 the other end of which is connected to one end of a secondary coil 124 of a transformer 125. The other end of the secondary coil 124 is grounded as at 126. A primary coil 130 of the transformer 125 has wires 131 and 132 extending from opposed ends thereof. The ends of the wires 131 and 132 remote from the coil 130 are connected to lead wires 133 and 134, respectively, leading from a suitable source of electrical energy, not shown.

The lead wire 133 is connected to one of the terminals of the relay switch 122 and the terminal at the other side of the relay switch 122 has one end of the wire 41 from the electric motor 37 connected thereto. The lead wire 134 is connected to one side of a master switch 136, the other side of the switch 136 having one end of the wire 40 from the electric motor 37 connected thereto to thus complete the description of the wiring diagram shown in Figure 3.

It will be observed in Figures 1 and 4 that the bracket or standard 75 extends at an angle relative to the vertical plane of the axis of the web support shaft 52 so as to position the shaft 90 to one side of a vertical plane of the axis of the roll 52. This will cause the point of suspension of the contact rings 91 to be disposed to one side of the contact wire 96. Now, when the point at which the rings contact a projection on the web material F is located slightly forward of an exact vertical position relative to the axis of the web support 52, or away from the direction from which the web material F is traveling, the rings 91, which rotate at the surface speed of the web material F will offer very little resistance to the cloth or other material F because the greater part of the weight is supported by the ring support 90 which extends through the same. This arrangement permits the detection of very small irregularities in the web material F because of a leverage action of the contact rings 91 relative to the point on the surface of the web material F at which the contact ring engages the web material and the contact wire 96.

In other words, upon an irregular portion in the web material F moving into engagement with any one or more of the metallic rings 91, the rings will be swung in the direction of movement of the web material F an amount equivalent to the thickness of the projection in the web material F. Now, since the contact wire 96 is also disposed forwardly of the axis of the ring support shaft 90 on which the metallic rings 91 are mounted, it is evident that forward movement, or movement from left to right in Figure 4, of the rings 91 will move the corresponding rings into engagement with the wire 96 thus permitting the wire 96 to be spaced a substantial distance farther apart from the rings 91 upon a very slight projection appearing on the web material, than would be possible, if the wire 96 were disposed in a vertical plane above the axis of the ring support shaft 90. In the latter instance, the wire 96 would have to be adjusted to a position much closer to the outer surfaces of the rings 91 then it would be in the event that the ring support shaft 90 and the contact wire 96 were disposed off center relative to the vertical axis of the ring support shaft 90 as shown in Figure 4.

By mounting the ring support shaft 90 and the contact wire 96 to the right of the vertical axis of the web support shaft 52, it is thus seen that a greater displacement is permissible between the metallic rings and the wire 96 than would be possible if the wire 96 and the shaft 91 were disposed in the vertical plane of the axis of the web support 52 to thereby prevent the metallic rings 91 from prematurely engaging the contact wire 96.

Now, upon a projection in the web material F engaging one or more of the metallic rings 91, the corresponding rings 91 are moved into engagement with the contact wire 96 in the manner heretofore described. A circuit to the wire 96 will then be grounded through the shaft 90. Since current flows from the source of electrical energy through the lead wires 133 and 134 and the wires 131 and 132 to the primary coil 130 of the transformer 125, one side of the secondary coil 124 being grounded at 126, the current will flow through the wire 123 to the coil of the relay switch 122 and through the wire 121 and wire 96 to be grounded through the metallic ring 91 and the ring support shaft 90.

This will open the relay switch 122 and will stop the flow of electrical energy to the electric motor 37, presuming the master switch 136 to be closed. It is evident that upon the metallic ring 91 moving out of engagement with the contact wire 96, the coil of the relay 122 will be de-energized thus permitting the relay 122 to complete the circuit to the electric motor 37 from the source of electrical energy through the wires 133 and 41, through the motor 37, through the wire 40 and switch 136 to the lead wire 134 thus completing the circuit of the electric motor 37.

It is evident that the web support 52 may be disposed above and to one side of the vertical axis of the ring support 90 and one or more of the electrical contacts 96 may be disposed adjacent opposed sides of the swingable rings 91, if desired, so the web material F may pass beneath the web support, normally partially displacing the swingable rings 91, whereby, upon a projection or a depression in the material F passing any of the rings 91, such rings will be further displaced to swing, by gravity in the event of a depression or by the pressure of a projection thereagainst, into engagement with the contacts on either side of the swingable rings.

Second form of the invention

Referring to Figures 5, 6, 7 and 8, there is shown a second form of inspecting apparatus which may also be mounted and used in the identical manner of the original form of the invention in association with a calender or other web processing machine. However, to enhance the many different purposes for which the improved inspecting apparatus may be employed the inspecting apparatus is shown on a cloth inspecting machine.

Figure 5:
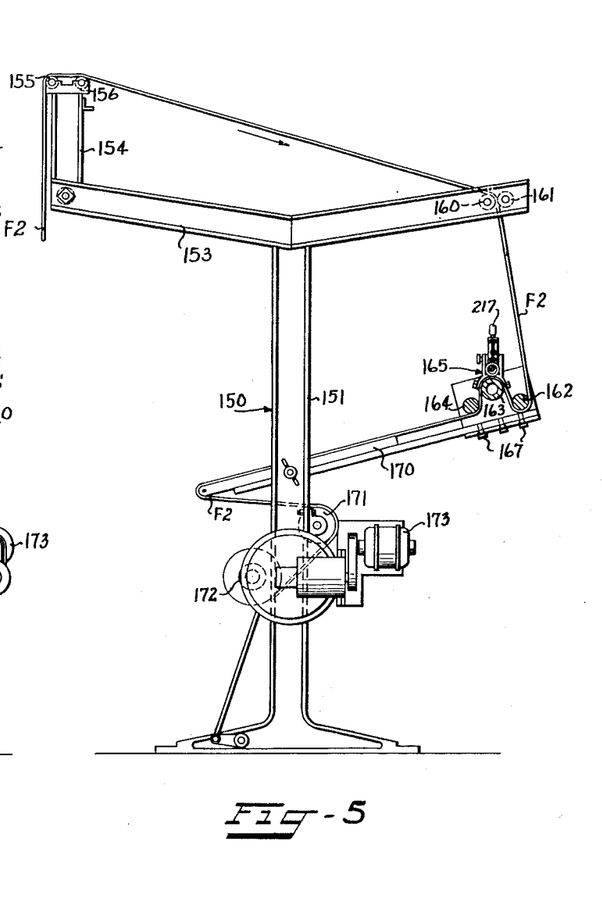
Figure 5 is a side elevation of a cloth inspector showing a second form of the invention applied thereto, portions of the invention being shown in cross-section for purposes of clarity.
Figure 6:
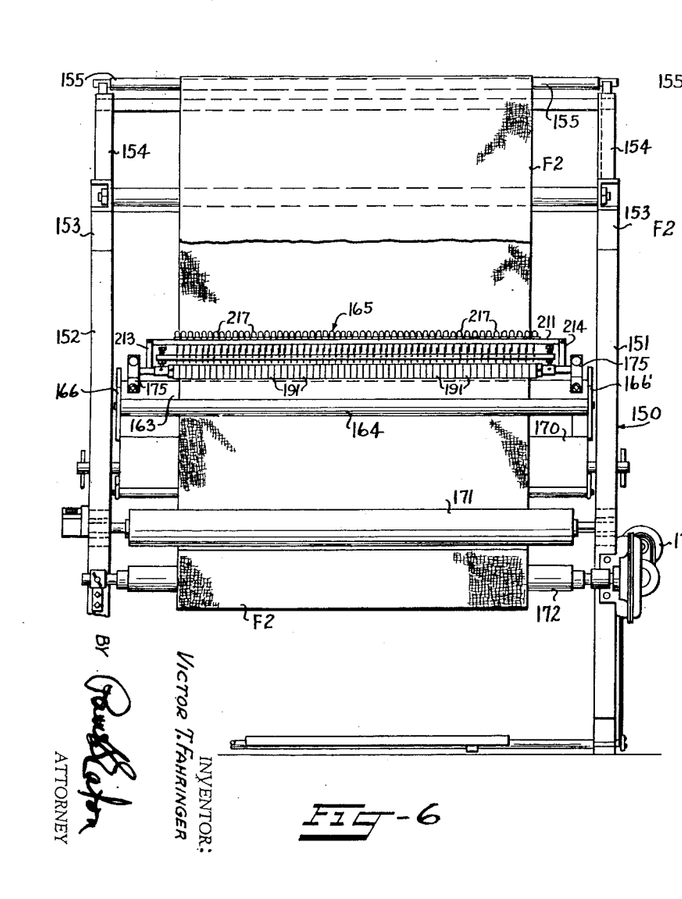
Figure 6 is an elevation looking at the left-hand side of Figure 5.

The second form of the invention shown in Figures 5, 6, 7 and 8 is substantially the same as the original form of the invention and many of the parts are identical. However, a complete description will be given relating to the second form of the invention for purposes of clarity. In Figures 5 and 6, the second form of the invention is shown in association with a typical cloth inspecting machine broadly designated at 150 and which comprises stands 151 and 152 each of which has a cross bar 153, of welded construction, mounted on the upper end thereof. The cross bars 153 each have a bearing stand 154 thereon for supporting opposed ends of cloth supporting rollers 155 and 156. The cloth, or other web material indicated at F2 extends to the rolls 155 and 156 from a suitable source, not shown, and then extends rearwardly and downwardly and passes between a pair of closely spaced cloth supporting rolls 160 and 161 suitably mounted in the rear ends of the cross bars 153 at the upper ends of the stands 151 and 152.

The web material F2 then extends downwardly from between the rolls 160 and 161 and passes beneath a first tension roll 162 and over web support shaft 163 and beneath a second tension roll 164, the tension rolls 162 and 164 being used in conjunction with the present invention and the roll 163 being a part of the second form of web and strand inspecting apparatus broadly designated at 165, a detailed description of which will be given later in the specification.

The opposed ends of the tension rolls 162 and 164 and the inspection roll 163 are fixedly mounted in suitable angle plates or brackets 166 and 166' secured, as by screws 167, to an inspection table 170. The tension rolls 162 and 164, like the tension rolls 46 and 54, in Figure 1, are provided for holding the web materials F2 in taut against the upper surface of the roll 163. The web material F2 then extends from beneath the tension roll 164 and passes over the inspection table 170 after which it is directed rearwardly and downwardly over an idler roll 171 and thus to a take-up roll 172 driven by a suitable motor 173 and intervening connections which are not pertinent to the present invention and a further description thereof is deemed unnecessary.

This cloth inspector 150 is substantially the same as a cloth inspector 100 shown in Figure 11 of United States Patent No. 1,930,074 of October 10, 1933.

Figures 7, 8, 9:
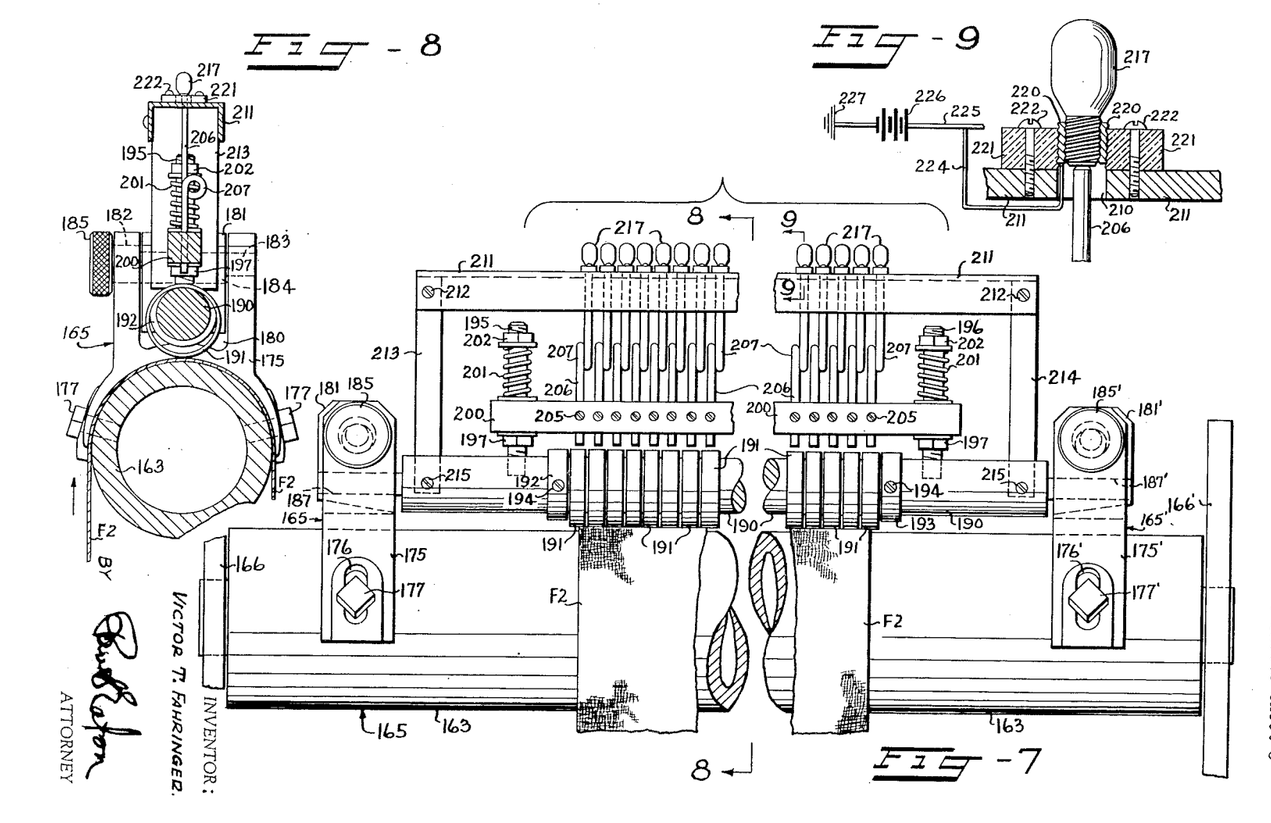
Figure 7 is an enlarged elevation of the second form of the invention shown in the central portion of Figure 6 with the central portion broken away.
Figure 8 is a vertical sectional view taken substantially along the line 8—8 in Figure 7.
Figure 9 is an enlarged vertical sectional view taken substantially along the line 9—9 in Figure 7 and showing an electrical apparatus associated therewith schematically.

Referring to Figures 7 and 8 detailed views are shown of the second form of the invention. The web support 163 has suitable brackets or standards, whose lower surfaces conform substantially to the curavature of the web support 163, fixedly mounted thereon. The brackets 175 and 175' are identical except being opposite hand and the parts associated with the bracket 175' will bear the same reference characters as like parts associated with the bracket 175 with the prime notation added.

The bracket 175 has a pair of adjustment slots 176 therein which are slidably penetrated by screws 177 for adjustably securing the brackets on the web support 163. These brackets 175 and 175' are identical to the brackets 75 and 75', in Figure 3, and the bracket 175 is shown in a vertical position in Figure 8 merely as an illustration to show the manner in which this bracket and parts mounted thereon may be adjusted around the web support shaft 163. The bracket 75 in Figure 4 is shown disposed at an angle to show another manner of adjustment thereof.

The bracket 175 has a slot or opening 180 therein in which a bearing member 181 is loosely mounted. One end of a shaft 182 is oscillatably mounted in one of the walls of the opening 180 and the other end of the shaft 182 has a restricted portion 183 integral therewith which is rotatably mounted in the opposite wall of the opening 180. This shaft 182 has an eccentric medial portion 184 which slidably penetrates and supports the bearing member 181. A suitable knurled knob 185 is secured to the left-hand end of the shaft 182 in Figure 8 for manipulation so as to adjust the bearing 181 and, consequently, a ring support 190 to be presently described.

Restricted end portions 187 and 187' of the ring support shaft 190 are slidably mounted in the bearing members 181 and 181', respectively, and, since this shaft 190 must not rotate, the restricted end portions 187 and 187' should preferably be square in cross section or should be keyed to the bearing members 181 and 181', respectively, to also permit movement of the bearing members 181 and 181' longitudinally of the end portions 187 and 187' while they are being adjusted.

The ring support 190, which is identical to the ring support 90, in the original form of the invention shown in Figure 3, also has a plurality of closely spaced metallic rings 191 swingably mounted thereon, the walls of which are of uniform thickness so the upper surfaces thereof may be disposed in substantially the same horizontal plane throughout the length of the ring support shaft 190 when their inner surfaces are resting against the upper surface of the ring support 190. Suitable collars 192 and 193 are secured as by screws 194, to the ring support shaft 190 to prevent excessive endwise movement of the metallic rings 191.

The lower ends of a pair of vertically disposed guide posts 195 and 196 are threadably embedded in the ring support shaft 190 and each of these guide posts 195 has a nut 197 adjacent the lower end thereof which supports an insulation bar 200 which is also loosely penetrated by the guide posts 195 and 196. A compression spring 201 encircles each of the guide posts 195 and 196 and urges the insulation bar 200 downwardly against the nut 197, the upper end of each of the compression springs 201 bearing against the lower surface of a nut and washer combination 202. Adjustably secured, as by screws 205, in the insulation block 200 and extending from the upper and lower surfaces thereof is a plurality of spaced metallic flexible contact members 206 whose lower ends are spaced a predetermined distance apart from the upper surfaces of the corresponding metallic rings 191 and, upon a projection in the web material F2 passing between the lower surface of any one or more of the rings 191 and the web support 163, the corresponding ring 191 will be moved upwardly and forwardly into engagement with the lower end of the corresponding contact member 206.

Now, each of these contact members 206 is looped intermediate the ends thereof, as at 207, and extends upwardly in Figure 7 and their upper ends extend through suitable openings 210 (Figure 9) in a horizontally disposed channel bar 211. Opposed ends of the channel bar 211 are secured as by screws 212 to the upper ends of posts 213 and 214. The lower ends of the posts 213 and 214 are restricted and are fixedly mounted adjacent opposed ends of the ring support 190, being secured therein as by set screws 215.

Referring to Figure 9, it will be observed that the upper end of each of the flexible contact members 206 bears against the contact of an incandescent lamp 217 threadably mounted in a metallic sleeve 220 which is, in turn, threadably mounted in an insulation base member 221 secured, as by screws 222, to the upper surface of the channel bar 211. Each of the metallic sleeves 220 has a branch wire 224 extending therefrom and all of the branch wires 224 are connected at their other ends to a common lead wire 225.

The lead wire 225 extends from a suitable source of electric current, such as a battery 226, shown schematically in Figure 9. The battery 226 is grounded as at 227.

It might be stated that although a web material F2 is shown in Figures 5, 6 and 7 in association with the modified form of inspecting apparatus 165, the apparatus is equally effective in determining the presence of thickened places in strand material, such as warp yarns and the like and the particular feature of this second form of the invention, shown in Figures 5, 6, 7 and 8, which is not included in the original form of the invention shown in Figures 1 to 4 inclusive, is the fact that upon any part of the web material or strands of yarn, as the case may be, passing beneath any particular one of the metallic rings 191, this particular ring will be moved upwardly and swung in the direction of travel of the web material F2 and will engage the lower end of the corresponding flexible contact member 206 while also remaining in engagement with the ring support 190. This will ground the circuit to the flexible contact member 206 through the corresponding lamp 217, the sleeve 220, the wire 224, the lead wire 225, the battery 226, and the ground 227 thus lighting the corresponding lamp 217.

It is thus seen that since the lamp 217 is disposed in a vertical plane substantially above the point at which a corresponding ring 191 may be moved into engagement with the lower end of the intervening contact member 206, the area of the web material F2 in which the obstruction or other type of projections is disposed may be quickly located by an operator thus saving considerable time in locating defects in web material and, of course, saving considerably in the cost of manufacture of the material F2.

Third form of the invention

Figure 10:
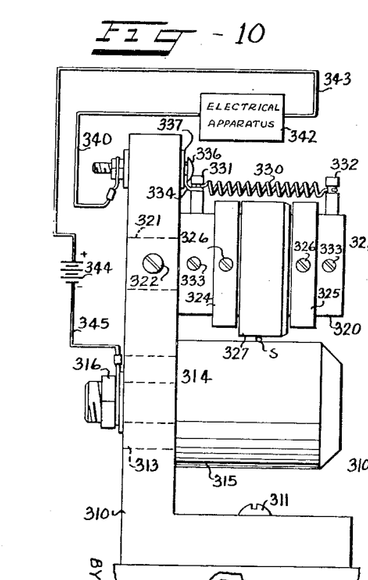
Figure 10 is an end elevation showing a third form of the invention utilized as a yarn inspecting apparatus and also showing an electrical apparatus connected thereto, the electrical apparatus being shown schematically.
Figures 11, 12, 13:
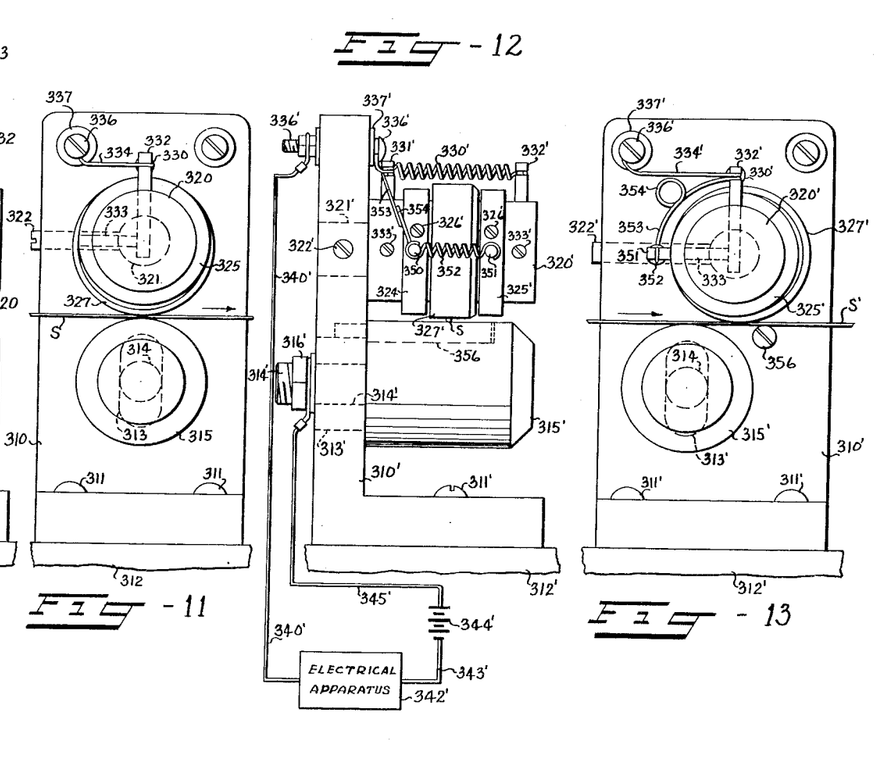
Figure 11 is an elevation looking at the right hand side of Figure 1.
Figure 12 is an end elevation showing a fourth form of the invention which is also utilized as a yarn inspecting apparatus and also showing an electrical apparatus connected thereto, the electrical apparatus being shown schematically.
Figure 13 is an elevation looking at the right hand side of Figure 12.

Referring now to Figures 10 and 11 the numeral 310 indicates a bracket of the third form of the invention and which is adapted to be secured, as by screws 311 to a suitable platform 312 which may be a part of a spinning frame, twister frame, winder, loom or any other textile machine wherein strands of material are processed. The bracket 310, in Figure 10, is shown as being substantially L-shaped, however, it is to be understood that this bracket 310 may be of any desired shape so the apparatus carried thereby may be mounted on any type of textile machine or the like. The vertical leg of the bracket 310 has a vertically extending adjustment slot 313 therein which is loosely penetrated by a restricted portion 314 of a strand or web support in the form of a lower stub shaft 315. This restricted portion 314 of the stub shaft 315 is threaded for reception of a nut 316 for securing the shaft 315 to the bracket 310.

A ring support in the form of a second or upper stub shaft 320 is disposed directly above and in parallel relation to the first stub shaft 315 and the axes of the stub shafts 315 and 320 are disposed in the same vertical plane as shown in Figures 10 and 11. The second stub shaft 320 has a restricted portion 321 integral therewith which is fixedly secured in the vertical leg of the bracket 310 as by a set screw 322.

The ring support 320 (Figures 10 and 11) has a pair of spaced collars 324 and 325 fixedly mounted thereon, as by set screws 326, between a metallic ring 327 is disposed. The metallic ring 327 is of a substantially greater inner diameter than the outside diameter of the ring support shaft 320 and is loosely mounted on the ring support 320.

A strand of material S, such as wire, textile yarn, roving or the like, is adapted to pass between the lower surface of the metallic ring 327 in engagement with the upper surface of the strand or web support 315. In the event of an obstruction, projection or thick place in the strand S passing over the lower shaft 315, the metallic ring 327 is then moved upwardly, as well as being swung in the direction of movement of the strand S, and there is disposed above the metallic ring 327 a coiled wire contact member 330. This contact member 330 may be of a straight piece of wire if so desired, however, the coiled wire is provided so as to provide resiliency to the contact member 330. This contact member 330 is mounted at opposed ends thereof on insulation posts 331 and 332 projecting upwardly from the ring support shaft 320 and being fixedly secured therein as by set screws 333.

A conductor wire 334 is connected at one end thereof to the post 331 and in engagement with one end of the contact member 330, its other end being connected to a terminal 336 in the form of a bolt extending through an insulation sleeve 337 fixedly mounted in the vertical leg of the bracket 310. The outer end of the terminal bolt 336 has one end of a conductor 340 removably secured thereto, the other end of which is connected to a suitable electrical apparatus 342 shown schematically in Figure 10. There are many types of electrical apparatus which may be actuated through the medium of the strand inspecting apparatus shown in Figures 10 and 11 which are well known to those familiar with the art and a detailed description of the same is deemed unnecessary. This electrical apparatus 342 may be a usual type of stop motion such as is associated with a loom, a spinning frame, a twister frame, a winder, a tricot knitting machine or a circular knitting machine or any other type of machine wherein a strand of yarn or the like is processed. The strand inspecting apparatus may also be employed in actuating any type of a warning signal such as an electric lamp, a buzzer or the like and which is also exemplified by the electrical apparatus 342.

It is evident that the strand inspecting apparatus may be used with either alternating or direct current, the direct current circuit shown in the drawings being by way of illustration only. Extending from the other side of the electrical apparatus 342 is a wire 343 which extends from one side of a source of electrical energy, such as a storage battery 344, shown schematically in Figure 10. Extending from the other side of the storage battery 344 is a wire 345 the other end of which is removably secured to the threaded restricted portion 314 of the lower shaft 315 by the nut 316.

It is evident that upon a thick place in the strand passing over the strand or web support 315 and elevating the metallic ring 327, the current will flow from the ground wire 345, through the storage battery 344, through the wire 343 to the electrical apparatus 342, causing actuation of the same, since the wire 340 extending from the other side of the electrical apparatus 342 will carry the current through the terminal bolt 336 and the contact member 330, the metallic ring 327 and ground the circuit to the ring support 320, it being understood that the ring support 320 and the strand or web support 315 are mounted in a metallic member serving as a conductor therebetween.

*Fourth form of the invention*

Referring to Figures 12 and 13, there is shown a modified form of strand inspecting apparatus which is substantially the same as the third form of the invention and wherein those parts shown in Figures 12 and 13 which are identical to the parts shown in Figures 10 and 11 will bear like reference characters with the prime notation added and these like parts will not be further described. However, in the fourth form of the invention shown in Figures 12 and 13, the ring support 320' is off-set from the vertical plane of the axis of the strand or web support 315' in the direction in which the strand S' is moving, which is from left to right in Figure 13.

An added feature of the fourth form of the invention shown in Figures 12 and 13, is the inclusion of a pair of insulation posts 350 and 351 which are fixedly mounted in and extend outwardly from the collars 324' and 325' and, since these collars 324' and 325' are secured to the upper shaft 325 by the set screws 326', it is evident that the position of the insulation posts 50 and 51 may be adjusted about the shaft 320'.

These posts 350 and 351 have opposed ends of a coiled spring contact member 352 connected thereto. This coiled spring contact member 352, like the coiled spring contact members 330 and 330', may be of a straight strand of metal or, a metal bar, or the like, the only purpose of providing a coiled spring as the contact member 352 being to provide inherent resiliency in this contact member 352 for obvious reasons. A conductor wire 353, which is looped intermediate the ends thereof, as at 354, is connected to the post 350 at one end thereof in engagement with one end of the contact member 352. The other end of the conductor wire 353 is connected to the post 331' in engagement with the conductor wire 334' and/or one end of the contact member 330'.

Also, provided in the fourth form of the invention, shown in Figures 12 and 13 is a support pin 356, one end of which is threadably embedded in the vertical leg of the bracket 310'. It will be observed, in Figure 13, that this pin 356 is disposed to the right of the vertical plane of the axis of the upper shaft 320' while the vertical plane of the axis of the lower shaft 315' is disposed to the left of the upper shaft 320'. Now, as the strand of material S' moves from left to right in Figure 13 under desired tension, the strand S' will support the metallic ring 327' and will tend to swing the same to the right or in the direction of movement of the strand S'. Upon the strand S' becoming severed or slackened or dislocated in any manner, the portion of the strand S' extending between the lower shaft 315' and the pin 356 will become slackened and will permit the metallic ring 327' to move downwardly by gravity. Inasmuch as the contact member 352 is disposed in close proximity to the ring support 320', as the metallic ring 327' swings downwardly seeking its normal center of gravity, it will move into engagement with the contact member 352 which will complete a circuit to the electrical apparatus in substantially the manner described relating to the third form of the invention shown in Figures 10 and 11.

Of course, upon a thickened place in the strand S' passing beneath the metallic ring 327' (Figures 12 and 13), it is evident that this ring 327' will be moved upwardly and forwardly in identically the manner described for the ring 327 in Figures 10 and 11 causing the same to again complete a circuit to the electrical apparatus 342'. It is thus seen that the fourth form of the invention shown, in Figures 12 and 13, not only will complete a circuit to the electrical apparatus 342 upon a thickened place or an obstruction in the strand S' passing beneath the metallic ring 327' but will also complete a circuit to the electrical apparatus 342' in the event that the strand of material S' becomes slackened or severed intermediate its points of support.

The ring supports in all forms of the invention are shown as being circular in cross-section. It is to be understood that, although this cross-sectional shape may be preferred, many other cross-sectional shapes may also be employed according to prevailing conditions. These other shapes may include square, elliptical, rectangular, semi-circular, polygonal etc.

As is well known, there are many processes through which textile fibres must pass in manufacturing a finished article. These processes include cleaning, breaking, blending, carding, drawing, spinning, twisting, weaving or knitting and many other processing operations and including many finishing and inspecting operations. The present invention may be employed in nearly all types of textile fibre processing operations and a few of the many different ways in which the present invention may be employed are as follows: A web or strand material may be moved through an inspecting machine or the like continuously and the present invention may have suitable connections associated therewith for connecting the same to a counter and/or a suitable marking device for either marking or registering a total number of defects appearing in the particular material being passed through the machine. It is also evident that the detecting ring supports of the first two forms of the invention may be adjusted about the web support so as to increase or decrease the effective weight of the detecting rings carried by the ring support so as to detect and/or differentiate between hard and soft areas in a web or strand material. This will also serve to detect whether or not an optimum tension is being retained in a web or strand material passing through a given point. It is evident, in the latter instance, that the present invention can be so arranged as to maintain a given tension in a web or strand material through suitable connections which may be actuated by the position of the detecting rings relative to the supporting means therefor for varying the speed of a take-up mechanism or the like upon the tension in the web or strand material varying beyond predetermined limits.

There may be instances in which sudden acceleration of the web or strand material passing in engagement with the swingable detecting rings may be prohibitive. The present invention may also be arranged so that sudden acceleration of the web material will, through frictional contact, cause sudden swinging movement of the detecting rings to where they may actuate a suitable stop motion or apparatus for controlling the speed of the web or strand material moving past the detecting rings. A positive and spontaneous reaction to irregularities in web or strand material may be effected in suitable coacting parts through the medium of the swingable detecting rings and due to the leverage of the rings with respect to their points of suspension and the points at which they are contacted by an irregular area appearing in the web or strand material, and also due to the manner in which the ring supports are mounted, particularly in the first and second forms of the invention, the thickness of the material passing in engagement with the detecting rings may be determined with minute accuracy to within, say, one ten thousandth of an inch if so desired.

In the drawings and specification there has been set forth a preferred embodiment of the invention and although specific terms are employed, they are used in a descriptive and generic sense only, and not for purposes of limitation, the scope of the invention being defined in the claims.

I claim.

1. An apparatus positioned in an electrical circuit for detecting the presence of thickened places in an elongated piece of material wherein there is provided a material support, and means for passing the material through the apparatus, characterized by a detecting ring support spaced above the material support, the axes of the material support and detecting ring support being in parallel relation to each other, at least one metallic detecting ring loosely and swingably mounted on said ring support and having its lower exterior surface in contact with the passing material to impart rotation to the ring, the inside diameter of said metallic ring being substantially greater than the outside diameter of the ring support, electrical contact means disposed above the ring support and in closely spaced relation to the upper surface of the metallic ring as it depends from said ring support whereby, upon a thickened place in the strand passing over said material support and engaging the metallic ring depending from said ring support, the metallic ring will be oscillated and elevated slightly to move the same into engagement with the contact member.

2. An apparatus positioned in an electrical circuit for detecting the presence of thickened places in a strand material wherein there is provided a material support, and means for conveying the material through the apparatus, characterized by a detecting ring support spaced above the material support, the horizontal axes of the material support and the ring support being in parallel relation to each other, at least one metallic detecting ring loosely and swingably mounted on said ring support and having its lower exterior surface in contact with the passing material to impart rotation to the ring, the inside diameter of said metallic ring being substantially greater than the outside diameter of the ring support, electrical contact means disposed above the ring support and in closely spaced relation to the upper surface of the metallic ring as it depends from said ring support, whereby upon a thickened place in the strand passing over said material support and engaging the metallic ring depending from said ring support, the metallic ring will be oscillated and elevated slightly to move the same into engagement with the electrical contact means, the electrical contact means comprising a bare metallic member extending horizontally above and across the ring and in spaced relation to the ring and insulated support means for the bare metallic contact member.

3. In an apparatus positioned in an electrical circuit for detecting the presence of thickened places in a strand material having a material support and electrical means for passing the strand through the apparatus, the combination of a detecting ring support spaced above the material support, the axes of the two supports being in parallel relation to each other, at least one metallic detecting ring loosely and swingably mounted on said ring support and having its lower exterior surface in contact with the passing material to impart oscillation to the ring, the inside diameter of said metallic ring being substantially greater than the outside diameter of the ring support, electrical contact means disposed above the ring support and in closely spaced relation to the upper surface of the metallic ring as it depends from said ring support, whereby, upon a thickened place in the strand passing over said strand support, the metallic ring will be oscillated and elevated slightly to move the same into engagement with the contact means and eccentric means for supporting the ends of the ring support for adjusting the position of the ring support relative to the material support.

4. An improvement in an apparatus positioned in an electrical circuit for detecting the presence of thickened places in a strand material having a strand support and means for moving the material through the apparatus, said improvement comprising a detecting ring support spaced above the strand support, the axes of the two supports being in spaced parallel relation to each other, at least one metallic detecting ring loosely and swingably mounted on said ring support, the inside diameter of said metallic ring being substantially greater than the outside diameter of the ring support, electrical contact means disposed above the ring support and in closely spaced relation to the upper surface of the metallic ring as it depends from said ring support, whereby, upon a thickened place passing over said strand support and engaging the metallic ring depending from said ring support, the metallic ring will be oscillated and elevated slightly to move the same into engagement with the contact member, the axis of the ring support being disposed in the same vertical plane as the axis of the strand support, a pair of pins carried by and insulated from the ring support and disposed on opposed sides of the ring and said electrical contact means comprising a bare conductor having its ends secured to said pins and extending above said ring.

5. An improvement in an apparatus positioned in an electrical circuit for detecting the presence of thickened places in a strand material having a strand support and means for passing the material through the apparatus, said improvement comprising a detecting ring support spaced above the strand support, the axes of the two supports being in parallel relation to each other, at least one metallic detecting ring loosely and swingably mounted on said ring support, the inside diameter of said metallic ring being substantially greater than the outside diameter of the ring support, electrical contact means disposed above the ring support and in closely spaced relation to the upper surface of the metallic ring as it depends from said ring support, whereby, upon a thickened place passing over said strand support and engaging the metallic ring depending from said ring support, the metallic ring will be oscillated and elevated slightly to move the same into engagement with the contact member, the axis of the ring support being disposed in the same vertical plane as the axis of the strand support, a pair of pins carried by and insulated from the ring support and disposed on opposed sides of the ring and said electrical contact means comprising a bare conductor having its ends secured to said pins and extending above said ring, and an additional electrical contact means disposed on the side of the ring from whence the strand is approaching and spaced from the ring, and insulated means carried by the ring support for supporting the additional electrical contact means.

6. In an apparatus positioned in an electrical circuit for detecting the presence of thickened places in a strand material having a strand support and means for progressing the material through the apparatus, the combination of a detecting ring support spaced above the strand support, the axes of the two supports being in parallel relation to each other, at least one metallic detecting ring loosely and swingably mounted on said ring support, the inside diameter of said metallic ring being substantially greater than the outside diameter of the ring support, electrical contact means disposed above the ring support and in closely spaced relation to the upper surface of the metallic ring as it depends from said ring support, whereby, upon a thickened place passing over said strand support and engaging the metallic ring depending from said ring support, the metallic ring will be oscillated and elevated slightly to move the same into engagement with the contact member and a second electrical contact means disposed in spaced relation to one side of the ring.

7. In an apparatus positioned in an electrical circuit for detecting the presence of thick places in textile material such as yarn strands, web material and the like having a material support and means for progressing the material through the apparatus, the combination of a detecting ring support spaced above the material support, the axes of both supports being in parallel relation to each other, a plurality of metallic detecting rings loosely and swingably mounted on said ring support in side by side relation, the inside diameter of said metallic rings being substantially greater than the outside diameter of the ring support, electrical contact means disposed above the ring support and in closely spaced relation to the upper surface of the metallic rings as they depend from said ring support, whereby, upon a thickened place passing over said material support and engaging a metallic ring depending from said ring support, the metallic ring will be oscillated and elevated slightly to move the same into engagement with the contact means.

8. In an apparatus positioned in an electrical circuit for detecting the presence of thick places in textile material such as yarn strands, web material and the like wherein there is provided a material support and means for progressing the material through the apparatus, the combination of a detecting ring support spaced above the material support, the axes of both supports being in parallel relation to each other, a plurality of metallic detecting rings loosely and swingably mounted on said ring support in side by side relation, the inside diameter of said metallic rings being substantially greater than the outside diameter of the ring support, electrical contact means disposed above the ring support and in closely spaced relation to the upper surface of the metallic rings as they depend from said ring support, whereby, upon a thickened place passing over said material support and engaging a metallic ring depending from said ring support, the metallic ring will be elevated slightly to move the same into engagement with the contact member to complete a circuit to the electrical apparatus and the electrical contact means comprising a bare conducting member.

9. In an apparatus positioned in an electrical circuit for detecting the presence of thickened places in textile material such as a web of yarn, cloth and the like having a material support and means for progressing the material through the apparatus, the combination of a detecting ring support spaced above the material support, the axes of the two supports being in parallel relation to each other, a plurality of metallic detecting rings loosely and swingably mounted on said ring support, the inside diameter of said metallic rings being substantially greater than the outside diameter of the ring support, a plurality of electrical contact means disposed above the ring support and in closely spaced relation to the upper surface of the metallic rings as they depend from said ring support, there being a contact means for each ring, whereby, upon a thickened place passing over said material support and engaging one or more of the metallic rings depending from said ring support, the metallic rings will be oscillated and elevated slightly to move the same into engagement with their associated contact members.

10. In an apparatus positioned in an electrical circuit for detecting the presence of thickened places in textile material such as a web of yarn, cloth and the like having a material support and means for progressing the material through the apparatus, the combination of a detecting ring support spaced above the material support, the axes of the two supports being in parallel relation to each other, a plurality of metallic detecting rings loosely and swingably mounted on said ring support, the inside diameter of said metallic rings being substantially greater than the outside diameter of the ring support, a plurality of electrical contact means disposed above the ring support and in closely spaced relation to the upper surface of the metallic rings as they depend from said ring support, there being a contact means for each ring, whereby, upon a thickened place passing over said material support and engaging one or more of the metallic rings depending from said ring support, the metallic rings will be oscillated and elevated slightly to move the same into engagement with their associated contact members and eccentric means for supporting the ends of the ring support for adjusting the position of the lower portion of the rings relative to the web support.

11. In an apparatus positioned in an electrical circuit for detecting the presence of thickened places in textile material such as a web or yarn, cloth and the like having a material support, means for progressing the material through the apparatus, the combination of a detecting ring support spaced above the material support, the axes of the two supports being in parallel relation to each other, a plurality of metallic detecting rings loosely and swingably mounted on said ring support, the inside diameter of said metallic rings being substantially greater than the outside diameter of the ring support, a plurality of electrical contact means disposed above the ring support and in closely spaced relation to the upper surface of the metallic rings as they depend from said ring support, there being a contact means for each ring, whereby, upon a thickened place passing over said material support and engaging one or more of the metallic rings depending from said ring support, the metallic rings will be oscillated and elevated slightly to move the same into engagement with the contact members, the axis of the ring support being disposed in the same vertical plane as the axis of the web support, a pair of pins carried by and insulated from the ring support and disposed on opposed sides of a series of rings and said electrical contact means comprising a bare conductor having its ends secured to said pins and extending above said rings.

12. In an apparatus positioned in an electrical circuit for detecting irregularities in web and strand material having means for progressing the material through the apparatus, the combination of a ring support, a plurality of metallic rings mounted for swinging movement on the ring support, the inside diameter of the rings being greater than the diameter of the ring support, said material moving in sliding engagement with the metallic rings so as to partially displace the rings, electrical contact means disposed in closely spaced relation to said rings, whereby, upon an irregularity in said material passing any of said rings, further displacement of said ring will be effected, thus swinging the ring into engagement with the contact means, the electrical contact means comprising a bare electric conductor disposed above and in parallel to the ring support and spaced from the uppermost portion of the rings.

13. In an apparatus positioned in an electrical circuit for detecting irregularities in web and strand material having means for progressing the material through the apparatus, the combination of a ring support, a plurality of metallic rings mounted for swinging movement on the ring support, the inside diameter of the rings being greater than the diameter of the ring support, said material moving in sliding engagement with the metallic rings so as to partially displace the rings, individual electrical contact means disposed above and in closely spaced relation to each of said rings, whereby, upon an irregularity in said material passing said rings, further displacement of said rings will be effected, thus swinging one or more rings into engagement with the individual electrical contact means.

14. In an apparatus positioned in an electrical circuit for detecting irregularities in web and strand material having means for progressing the material through the apparatus, the combination of a ring support, a plurality of metallic rings mounted for swinging movement on the ring support, the inside diameter of the rings being greater than the diameter of the ring support, said material moving past and in sliding engagement with the metallic rings so as to partially displace the rings, individual electrical contact means disposed above and in closely spaced relation to each of said rings, whereby, upon an irregularity in said material passing said rings, further displacement of said rings will be effected, thus swinging one or more rings into engagement with the individual contact means and vertically adjustable means for supporting the ends of the ring support.

15. In an apparatus positioned in an electrical circuit for detecting irregularities in web and strand material, having means for progressing the material through the apparatus, the combination of a ring support disposed above the material, a plurality of metallic rings mounted for swinging movement on the ring support, the inside diameter of the rings being greater than the diameter of the ring support, said material moving past and in sliding engagement with the metallic rings so as to partially displace the rings, electrical contact means disposed above and in closely spaced relation to said rings, whereby, upon an irregularity in said material passing said rings, further displacement of one or more of said rings will be effected, thus swinging the rings into engagement with the contact means and a second electrical contact means disposed in spaced relation to the side of the rings from whence the material approaches.

16. In an apparatus having means for progressing web or strand material therethrough, an improved stop motion connected in an electrical circuit with said apparatus for detecting irregularities in said web or strand material comprising the combination of a ring support, at least one metallic ring mounted for swinging movement on the ring support, the inside diameter of the ring being greater than the diameter of the ring support, the material slidably engaging the lowermost portions of said ring, electrical contact means disposed in closely spaced relation to said ring, whereby, upon an irregularity in said material passing said ring, further displacement of said ring will be effected, thus swinging the ring into engagement with the contact means.

VICTOR T. FAHRINGER.

References Cited in the file of this patent

UNITED STATES PATENTS

| Number | Name | Date |
|---|---|---|
| 568,205 | Norden | Sept. 22, 1896 |
| 701,248 | Bannon | May 27, 1902 |
| 869,324 | Obert | Oct. 29, 1907 |
| 1,012,379 | Longden | Dec. 19, 1911 |
| 1,071,608 | Dear et al. | Aug. 26, 1913 |
| 1,149,018 | Beregh | Aug. 3, 1915 |
| 2,523,184 | Beall | Sept. 19, 1950 |